United States Patent [19]

Mainard

[11] Patent Number: 5,791,666
[45] Date of Patent: Aug. 11, 1998

[54] SHOPPING CART HAVING CLIPS FASTENING PLASTIC BASKET TO WHEELED CHASSIS

[75] Inventor: Tommy Doyle Mainard, Wagoner, Okla.

[73] Assignee: Unarco LLC, Wagoner, Okla.

[21] Appl. No.: 532,966

[22] Filed: Sep. 22, 1995

[51] Int. Cl.⁶ .................................................. B62B 3/02
[52] U.S. Cl. .................................. 280/33.991; 24/458
[58] Field of Search ..................... 280/33.991, 33.997, 280/653, 654, 47.31; 24/458, 457

[56] References Cited

U.S. PATENT DOCUMENTS

| | | | |
|---|---|---|---|
| 3,488,091 | 1/1970 | Baker | 280/47.31 X |
| 3,829,114 | 8/1974 | Cohen et al. | 280/33.991 |
| 4,632,411 | 12/1986 | Badger | 280/33.991 |
| 4,650,199 | 3/1987 | Rehrig | 280/33.99 S |
| 4,746,134 | 5/1988 | Rehrig | 280/33.991 |
| 5,255,930 | 10/1993 | Jones et al. | 280/33.992 |

Primary Examiner—Brian L. Johnson
Assistant Examiner—Michael Mar
Attorney, Agent, or Firm—Rockey, Milnamow & Katz, Ltd.

[57] ABSTRACT

In a shopping cart comprising a wheeled chassis, a handle structure including two handle uprights extending upwardly from the wheeled chassis, and a basket supported on the wheeled chassis and fastened to the handle uprights, two clips are employed for fastening the basket to the wheeled chassis. Each clip is fastened to an associated, generally horizontally extending portion of a frame of the wheeled chassis, beneath one of the side walls of the basket. Each clip has an upper, flanged end, which extends at least partly into an associated recess provided in one of the side walls of the basket and a lower, curved end, which conforms generally to and extends at least partly beneath the associated, generally horizontally extending portion of the frame. The frame of the wheeled chassis includes a tubular member defining the generally horizontally extending portions, to which the clips are riveted.

3 Claims, 3 Drawing Sheets

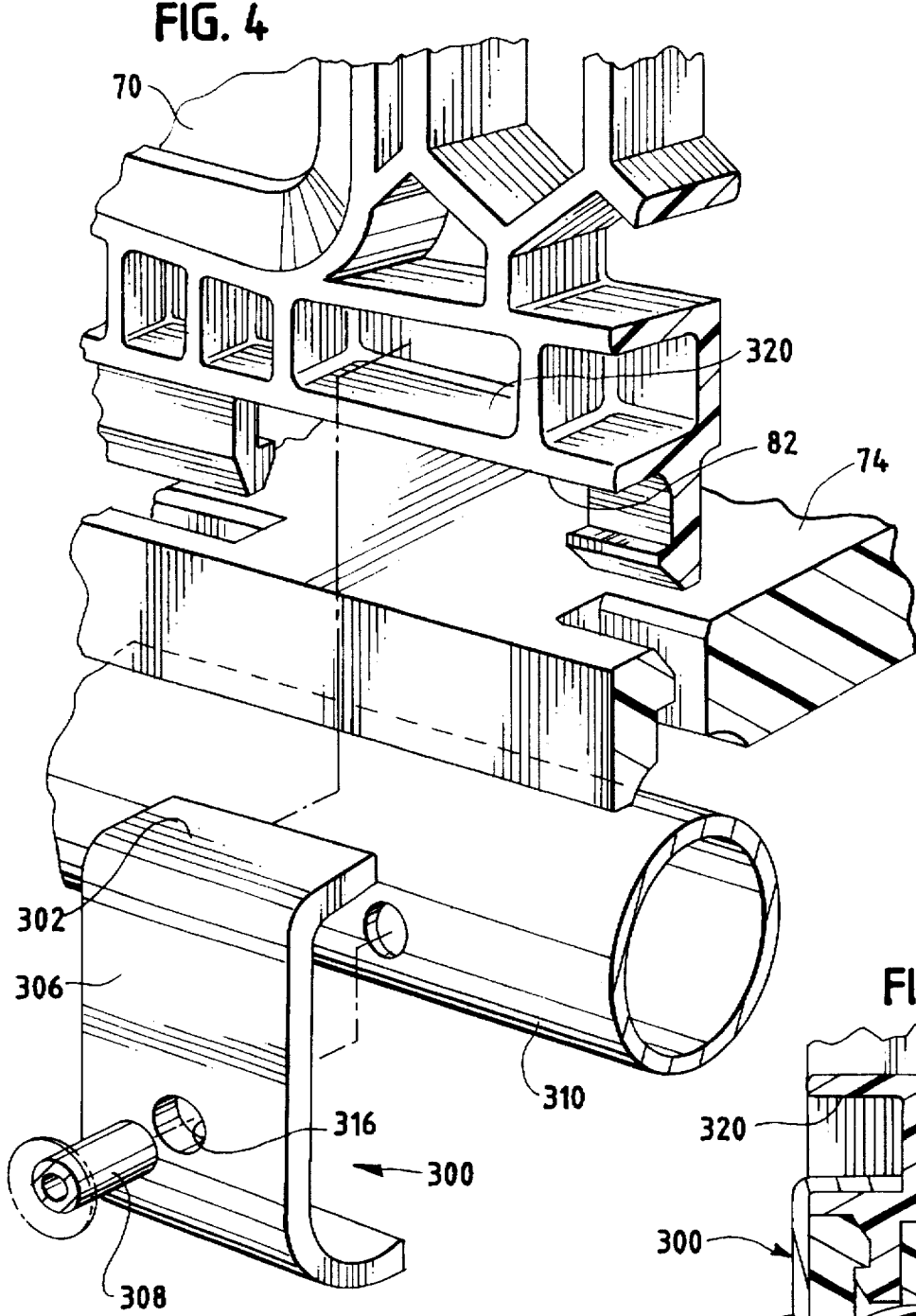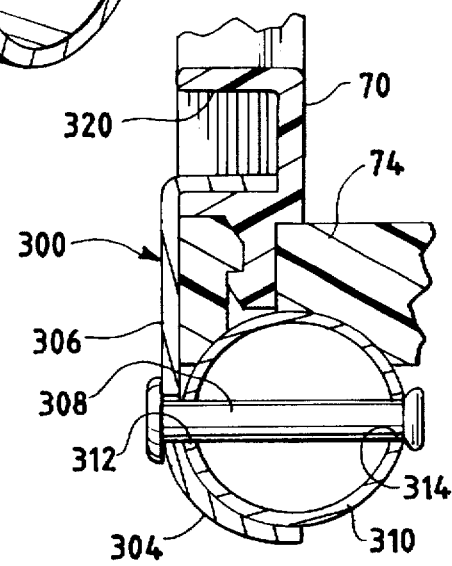

SHOPPING CART HAVING CLIPS FASTENING PLASTIC BASKET TO WHEELED CHASSIS

TECHNICAL FIELD OF THE INVENTION

This invention pertains to shopping cart of a type comprising a wheeled chassis, a handle structure including two handle uprights extending upwardly from the wheeled chassis, and a basket having respective front, bottom, and side walls molded from a plastic material, in an arrangement wherein the basket is supported on the wheeled chassis and is fastened to the handle uprights. According to this invention, two clips are employed for fastening the basket to the wheeled chassis.

BACKGROUND OF THE INVENTION

In a shopping cart of the type noted above, as exemplified in Jones et al. U.S. Pat. No. 5,225,930, the basket has separate front, bottom, and side walls molded from a plastic material, such as high density polyethylene or polyurethane, and the basket is assembled without any need for an interior frame. Thus, a rim wire associated with the basket is bent to provide two prongs, which extend into apertures in the handle uprights. Also, as illustrated and described therein, rivets are employed to fasten the basket to the wheeled chassis and to the handle uprights.

Assembly of a shopping cart of the type noted above, as exemplified in the Jones et al. patent noted above, has proved to be labor-intensive, largely because a large number of rivets are employed. A need has arisen, to which this invention is addressed, for a simpler way to fasten the basket to the wheeled chassis.

SUMMARY OF THE INVENTION

This invention provides a shopping cart of the type noted above with two clips for fastening the basket to the wheeled chassis. Each clip is fastened to the wheeled chassis beneath one of the side walls of the basket. Each clip extends at least partly into an associated recess provided in the basket so as to fasten the basket to the wheeled chassis.

As exemplified in the Jones et al. patent noted above, the wheeled chassis may include a frame having generally horizontally extending portions supporting the bottom wall of the basket. Each clip may be advantageously fastened to an associated, generally horizontal portion of the frame.

Preferably, each clip has an upper, flanged end, which extends at least partly into the associated recess. The associated recess may be advantageously provided in one of the side walls of the basket. Preferably, each clip has a lower, curved end, which extends at least partly beneath one of the generally horizontal portions of the supporting frame.

Typically, the frame of the wheeled chassis includes a tubular member, which defines two generally horizontally extending portions. Thus, each clip may be advantageously riveted to the tubular member. Preferably, the lower, curved end of each clip conforms generally to and extends at least partly beneath the tubular member where the tubular member defines the associated, generally horizontally extending portion of the frame.

These and other objects, features, and advantages of this invention are evident from the following description of a preferred embodiment of this invention with reference to the accompanying drawings.

BRIEF DESCRIPTION OF THE DRAWINGS

FIG. 4, on a greatly enlarged scale, is an exploded, perspective detail showing one of two clips, as used to fasten a basket of the shopping cart to a wheeled chassis of the shopping cart, at one generally horizontal portion of a tubular member of a frame of the wheeled chassis.

FIG. 5, on a similarly enlarged scale, is a sectional view taken along line 5—5 of FIG. 1, in a direction indicated by arrows.

DETAILED DESCRIPTION OF THE PREFERRED EMBODIMENT

Figure 1:
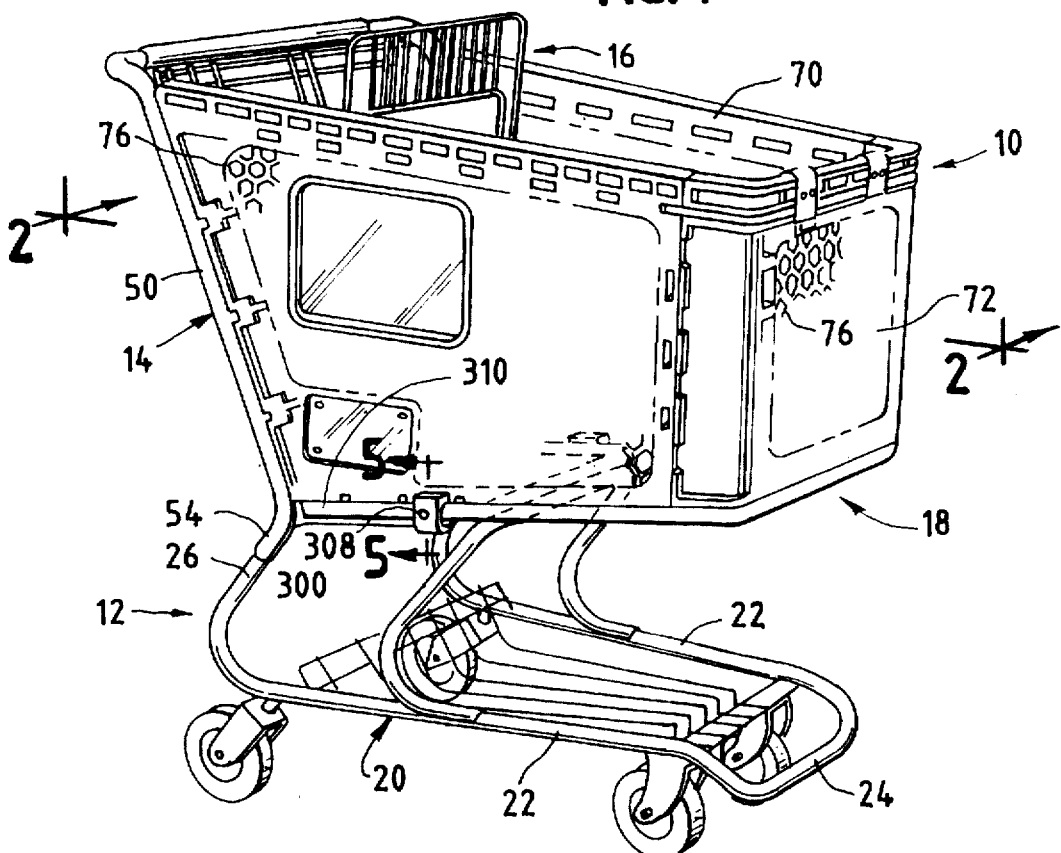
FIG. 1 is a perspective view of a shopping cart constituting a preferred embodiment of this invention.

As shown in FIG. 1 and other views, a shopping cart 10 comprising a wheeled chassis 12, a handle structure 14, a pivotable back 16, and a plastic basket 18 constitutes a preferred embodiment of this invention. Except as illustrated and described herein, the shopping cart 10 may be essentially like the shopping cart illustrated and described in Jones et al. U.S. Pat. No. 5,255,930, the disclosure of which is incorporated herein by reference.

The wheeled chassis 12 is similar to wheeled chassis used on shopping carts known heretofore, such as Model 85 Shopping Carts made and sold by Unarco Commercial Products of Wagoner, Okla., formerly of Oklahoma City, Okla.

The wheeled chassis 12 comprises a main frame 20 made from steel tubing bent so as to form two side portions 22 extending longitudinally at a slight angle relative to each other, a front portion 24 extending transversely from and connecting the side portions 22, two back portions 26, each extending upwardly and frontwardly from one of the side portions 22 at a slight inclination so as to define two generally horizontally extending portions, and a transverse portion 28 extending transversely between the back portions 26. The intermediate portion 28 comprises welded ends of the steel tubing of the main frame 20 about midway between the side portions 22.

The wheeled chassis 12 also comprises an intermediate brace 30 made from steel tubing bent so as to form two side portions 32, each being welded to one of the side portions 22 of the main frame 20 at a lower, saddle-shaped end 34, and an upper, transverse portion 36 connecting the side portions 32 and extending transversely beneath the transverse portion 28 of the main frame 20. The transverse portion 36 of the intermediate brace 30 is disposed beneath the transverse portion 28 of the main frame 20 and is welded to such portion 28. Moreover, the wheeled chassis 12 comprises a welded wire shelf 38 mounted to the main or supporting frame 20, between the side portions 22. Four castors 40 are mounted beneath the side portions 22 in a known manner.

The handle structure 14 is made from steel tubing bent to form two upright portions 50 and a transverse portion 52 connecting the upright portions 50 at their upper ends. Each of the upright portions is riveted to one of the back portions 26 of the main frame 20 of the wheeled chassis 12, at a lower, saddle-shaped end 54. The upright portions 50 may be conveniently referred to as the handle uprights 50.

Figure 2:
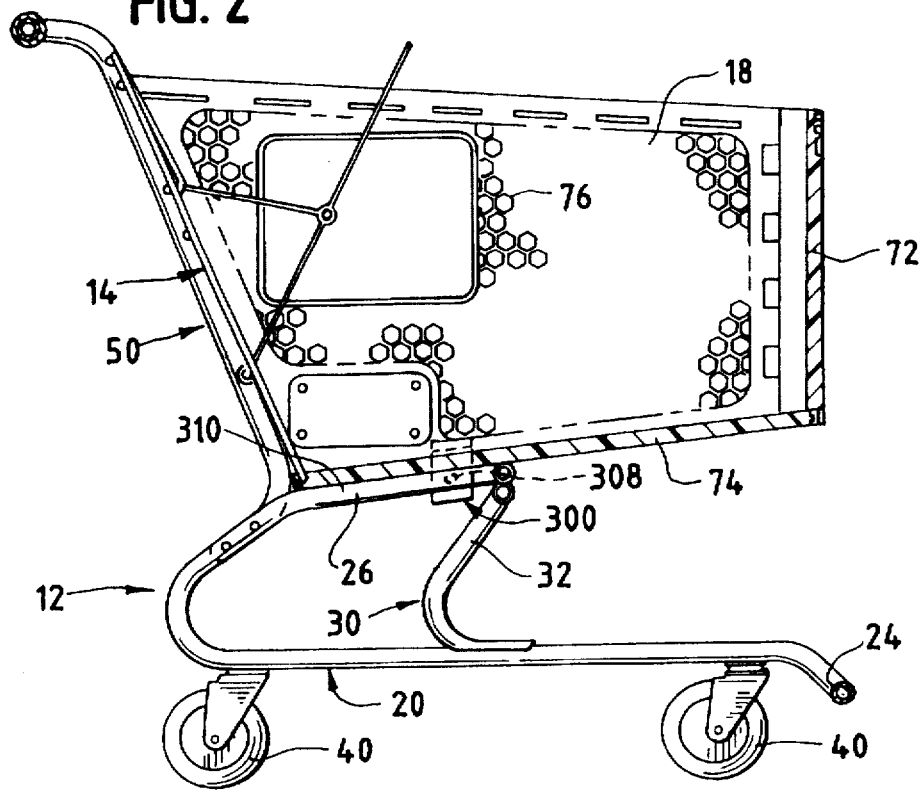
FIG. 2 is a sectional view taken along line 2—2 of FIG. 1, in a direction indicated by arrows.
Figure 3:
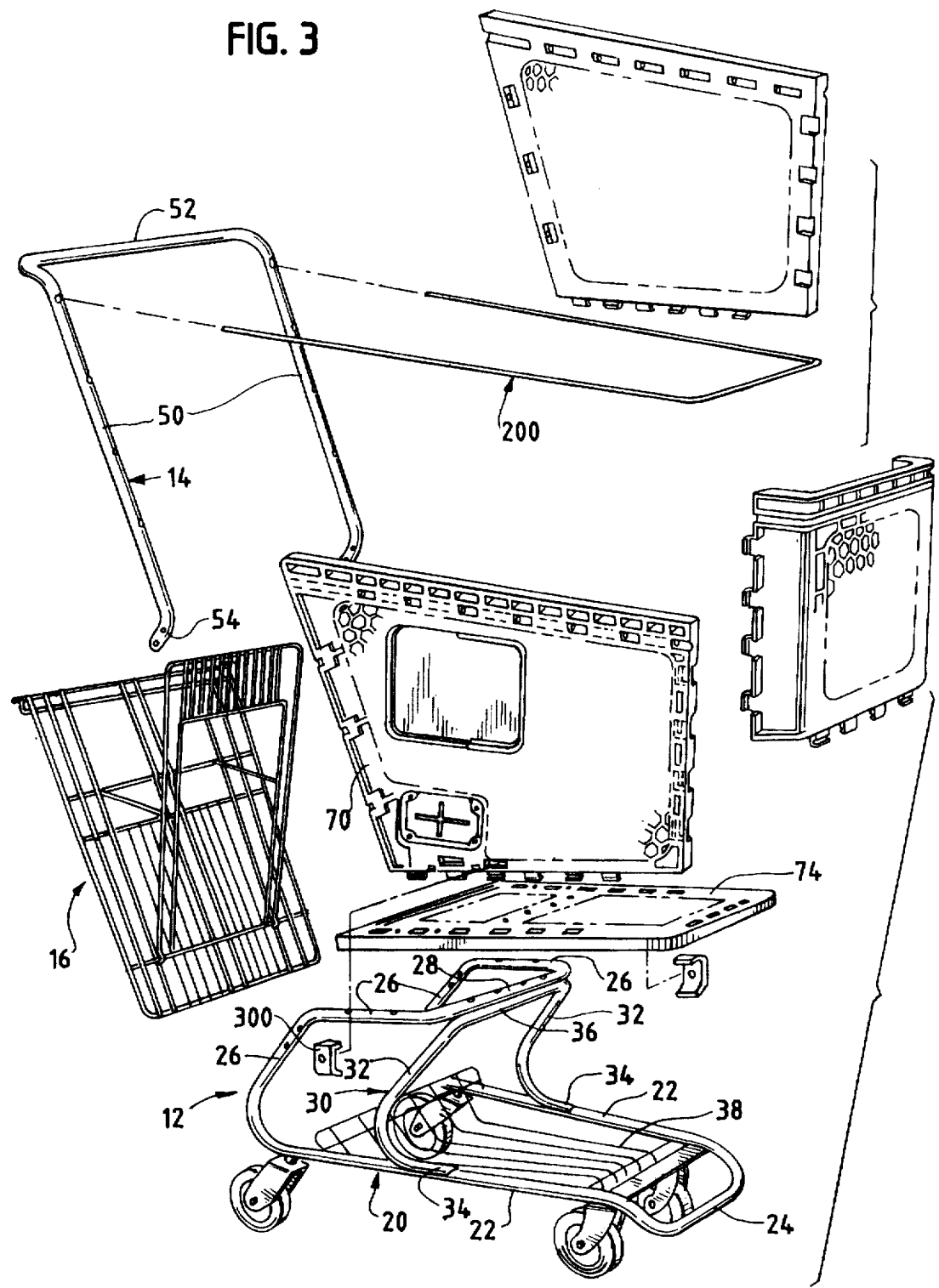
FIG. 3 is an exploded, perspective view of elements of the shopping cart.

The pivotable back 16 is similar to the pivotable backs used on shopping carts known heretofore, such as Model 85 Shopping Carts made and sold by Unarco Commercial Products, supra. At its upper edge, on each side, the pivotable back 16 is mounted pivotally to the handle uprights 50 so as to be upwardly pivotable when a similar cart (not shown) is nested with the shopping cart 10. The pivotable back 16 is manipulatable either to provide a baby seat 58, as shown in FIG. 2, or to fold backwardly so as to be substantially coplanar with the handle uprights 50. Further structural and functional details of the pivotable back 16 are outside the scope of this invention and can be readily supplied by persons having ordinary skill in the art.

The plastic basket 18 is fastened to the handle uprights 50 and to the main frame 20 of the wheeled chassis 12 in a manner to be later described. The plastic basket 18 comprises two side panel members 70, a front panel member 72, and a bottom panel member 74, each being molded from a suitable plastic. The side and front panel members have extensive patterns of hexagonal holes 76. The bottom panel member has extensive patterns of square holes 78. These patterns of holes reduce the overall weight of the panel members and permit visual access to the basket interior. Although hexagonal holes are preferred for the side and front panel members, square, diamond-shaped, or differently shaped holes may be alternatively used. A preferred material for molding the panel members is high density polyethylene. An alternative material therefor is polyurethane.

The side panel members 70, the front panel member 72, and the bottom panel member 74 are assembled to one another via tabs and slots in a manner disclosed in the Jones et al. patent, supra, to define the side, front, and bottom walls of the basket 18. A rim wire 200 and at least one rivet (not shown) along the front edge 80 of each side panel member 70 are employed in a manner disclosed in the Jones et al. patent, supra, to fasten the plastic basket 18 to the handle uprights 50.

As shown in FIGS. 4 and 5, a generally inverted-L-shaped, steel clip 300 having an upper, substantially horizontal, flanged end 302 and a lower, curved end 304 is associated with each side panel member 70 and is fastened at a planar, vertical portion 306 between the ends 302, 304, by a rivet 308 to an associated, generally horizontally extending portion 310 of the frame 20, beneath the bottom panel member 74 and an associated one of the side panel members 70, where one of the back portions 26 extends forwardly toward the intermediate portion 28. The frame portion 310 has aligned holes 312, 314, to accommodate the rivet 308. The clip portion 306 has a hole 316 to accomodate the rivet 308. The upper, flanged end 302 of the clip 300 extends at least partly into an associated recess 320, which is provided in such side panel member 70, along and near the bottom edge 82 of such side panel member 70, above the bottom panel member 74 in the assembled basket 18. The associated recess 320 is molded into such side panel member 70. The lower, curved end 304 of the clip 300 conforms generally to, embraces, and extends at least partly beneath the associated, generally horizontally extending portion 310 of the main frame 20. The planar portion 306 engages the associated one of the side panel members 70 and a near edge of the bottom panel member 72.

Because the clips 300 and the rivets 308 fasten the plastic basket 18 securely and rigidly to the wheeled chassis 12, there is no need to employ any other rivets, screws, or fasteners to fasten the plastic basket 18 to the wheeled chassis 12, and fewer rivets, screws, or other fasteners are needed to fasten the plastic basket 18 to the handle uprights 50.

Various modifications may be made in the preferred embodiment described above without departing from the scope and spirit of this invention.

I claim:

1. A shopping cart comprising a wheeled chassis, a handle structure including two handle uprights extending upwardly from the wheeled chassis, a basket supported on the wheeled chassis and fastened to the handle uprights, and two clips for fastening the basket to the wheeled chassis, the basket having a front wall, a bottom wall, and two side walls, the front, bottom, and side walls being molded from a plastic material, each side wall having a transversely opening recess, which is molded into said side wall and which defines an upwardly facing, substantially horizontal, lower surface which overlies an associated side portion of the bottom wall, the wheeled chassis including a frame including a tubular member having two generally horizontally extending portions, the frame supporting the bottom wall of the basket, each generally horizontally extending portion being disposed beneath the associated side portion of the bottom wall and one of the side walls of the basket, each clip being generally inverted-L-shaped with a planar, vertical portion, a lower, curved end, and an upper, substantially horizontal, flanged end, the planar, vertical portion engaging an associated one of the side walls and a near edge of the bottom wall of the basket and being fastened by a mechanical fastener solely to an associated one of the generally horizontally extending portions of the frame when disposed beneath the associated side portion of the bottom wall and the associated one of the side walls of the basket, the lower, curved end conforming generally to and embracing the associated one of the generally horizontally extending portions of the frame, the upper, substantially horizontal, flanged end extending at least partly into and engaging the substantially horizontal, lower surface defined by the transversely opening recess molded in the associated one of the side walls of the basket, so as to fixedly secure together the associated side wall, the bottom wall, and the associated portion of the frame.

2. The shopping cart of claim 1 wherein each mechanical fastener is a rivet.

3. A shopping cart comprising a wheeled chassis, a handle structure including two handle uprights extending upwardly from the wheeled chassis, a basket supported on the wheeled chassis and fastened to the handle uprights, and two clips for fastening the basket to the wheeled chassis, the basket having a front wall, a bottom wall, and two side walls, the front, bottom, and side walls being molded from a plastic material, each side wall having a transversely opening recess, which is molded into said side wall and which defines an upwardly facing, substantially horizontal, lower surface which overlies an associated side portion of the bottom wall, the wheeled chassis including a frame including a tubular member having two generally horizontally extending portions, the frame supporting the bottom wall of the basket, each generally horizontally extending portion being disposed beneath the associated side portion of the bottom wall and one of the side walls of the basket, each clip being generally inverted-L-shaped with a planar, vertical portion, a lower, curved end, and an upper, substantially horizontal, flanged end, the planar, vertical portion being fastened by a mechanical fastener solely to an associated one of the generally horizontally extending portions of the frame when disposed beneath the bottom wall and the associated one of the side walls of the basket, the lower, curved end conforming generally to and embracing the associated one of the generally horizontally extending portions of the frame, the upper, substantially horizontal, flanged end extending at least partly into and engaging the substantially horizontal, lower surface defined by the transversely opening recess molded in the associated one of the side walls of the basket, so as to fixedly secure together the associated side wall, the bottom wall, and the associated portion of the frame.

* * * * *